United States Patent [19]

Juds et al.

[11] Patent Number: 4,922,197
[45] Date of Patent: May 1, 1990

[54] HIGH RESOLUTION PROXIMITY DETECTOR EMPLOYING MAGNETORESISTIVE SENSOR DISPOSED WITHIN A PRESSURE RESISTANT ENCLOSURE

[75] Inventors: Mark A. Juds, New Berlin; Bruce C. Beihoff, Glendale, both of Wis.

[73] Assignee: Eaton Corporation, Cleveland, Ohio

[21] Appl. No.: 226,499

[22] Filed: Aug. 1, 1988

[51] Int. Cl.$^5$ .................................................. G01B 7/30
[52] U.S. Cl. .............................. 324/207.21; 338/32 R; 324/207.26
[58] Field of Search ............... 324/207, 208, 262, 252, 324/173, 174; 338/32 R, 32 H; 310/168

[56] References Cited

U.S. PATENT DOCUMENTS

| | | | |
|---|---|---|---|
| 3,636,767 | 1/1972 | Duffy | 324/174 |
| 3,846,697 | 11/1974 | Cila et al. | 324/174 X |
| 4,045,738 | 8/1977 | Buzzell | 324/208 X |
| 4,053,829 | 10/1977 | Maruo | 324/252 X |
| 4,256,986 | 3/1981 | Anderson | 324/174 X |
| 4,670,715 | 6/1987 | Fuzzell | 324/208 |
| 4,680,543 | 7/1987 | Kohen | 324/208 |
| 4,725,776 | 2/1988 | Onodera et al. | 324/208 |
| 4,727,323 | 2/1988 | Zabler | 324/252 |
| 4,788,870 | 12/1988 | Gath et al. | 324/208 X |

FOREIGN PATENT DOCUMENTS

| | | | |
|---|---|---|---|
| 2532985 | 2/1976 | Fed. Rep. of Germany | 324/252 |
| 54-058069 | 5/1979 | Japan | 324/252 |
| 1282026 | 1/1987 | U.S.S.R. | 324/252 |

Primary Examiner—Reinhard J. Eisenzopf
Assistant Examiner—Warren S. Edmonds
Attorney, Agent, or Firm—J. G. Lewis

[57] ABSTRACT

A tachometer sensor adapted for measuring the rotation of a gear or spline shaft target within a high pressure environment includes an integrally formed housing having a generally tubular elongate probe defining a sealed interior cavity receiving an annular permanent magnet at the sensing end thereof, field focusing means such as a ferrous pin disposed concentrically with the permanent magnet to shape the field established thereby, at least one magnetoresistive transducer concentrically disposed with the magnet to detect distortions of the magnetic field effected by passage of the target and means in-circuit with the transducer which generates a usable output signals as a function of sensed magnet field distortion.

33 Claims, 2 Drawing Sheets

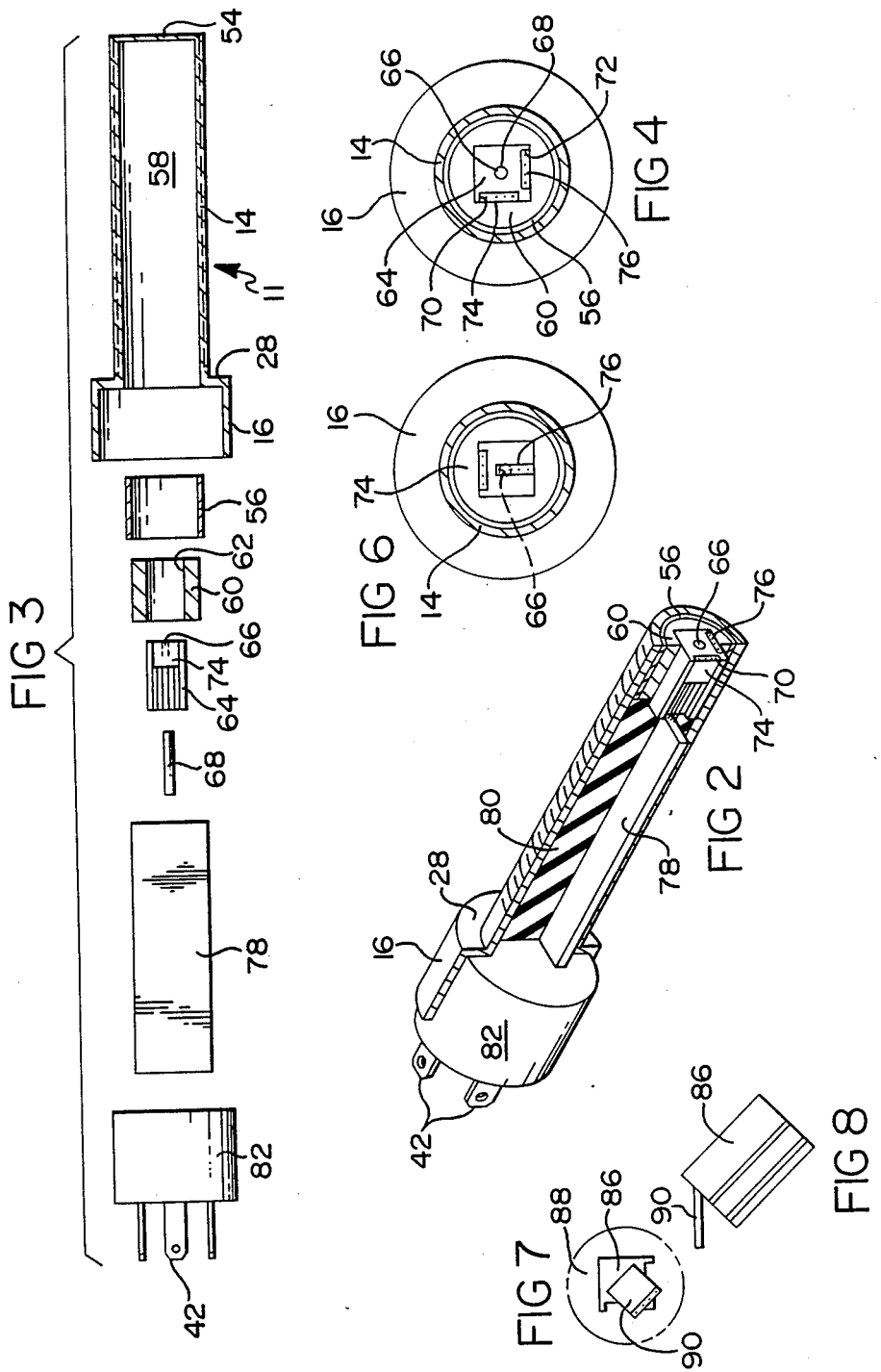

HIGH RESOLUTION PROXIMITY DETECTOR EMPLOYING MAGNETORESISTIVE SENSOR DISPOSED WITHIN A PRESSURE RESISTANT ENCLOSURE

TECHNICAL FIELD

The present invention relates to an apparatus for detecting the presence of a target within a sensing region and is particularly directed to sensing the rotation of a shaft or machine element within a high pressure environment.

BACKGROUND OF THE INVENTION

Proximity switches are generally known in the art and have been widely applied to sense the position of a moving machine element. Such known proximity sensors frequently employ a probe which is rigidly mounted to a fixed portion of an associated machine element and extending toward the intended target such as splines on a rotating shaft. The probe terminates adjacent the shaft and contains a sensor which is electrically interconnected with a control circuit and is inductively or magnetically coupled to the target as it rotates in close proximity to the sensor.

Various technologies have been employed to effect a coupling between the sensor and moving target. For example, some are known to utilize an oscillator drive circuit in combination with an induction tank circuit. The tank circuit includes an induction coil within the probe as a means for sensing the presence of a metal object. The induction coil is constructed such that it generates a magnetic field in the area surrounding the coil. The magnetic field induces eddy currents in a conductive object within the field. Such objects are known in the art as targets. Once a target comes within the magnetic field of the coil, energy is drawn from the induction coil. A typical induction proximity switch selects components of the oscillator and tank circuit to ensure that oscillations occur when a target is absent from the magnetic field of the induction coil. When a target comes within the magnetic field, the oscillation amplitude is attenuated due to the loss of energy caused by eddy currents induced in the target. The amount of oscillation attenuation is directly related to the distance between the target and the induction coil.

Another common approach is the use of a Hall sensor within the probe and a concentric permanent magnet ring carried on the rotating shaft. Hall effect sensors have, however, proven to be application limited in as they tend to be fragile and range limited and are thus unsuitable in some applications. Furthermore, all sensors do not provide field shaping or transformer action needed to concentrate magnetic flux field for extremely sensitive contactless measurement.

Although more robust devices are known, they tend to be less sensitive, requiring extremely close positioning with respect to the rotating target. Furthermore, they may require a uniquely shaped target and be unsuitable for detecting the presence of standard design machine elements such as gear teeth and shaft splines. Furthermore, the requirement of close positioning raises the potential for misassembly wherein the sensor will be positioned too far from the target to effectively sense its rotation or, conversely, be positioned too closely whereby it is contacted and damaged by the rotating target.

Another disadvantage of many prior art sensors is that they cannot delineate the direction of passage of a target through the sensor's sensing region and thereby cannot discern direction of shaft rotation.

A final problem with typical prior art sensors is that they are pressure limited (typically 50 psi) and cannot tolerate operation within a high pressure environment such as hydraulic equipment.

BRIEF DESCRIPTION OF THE INVENTION

The present invention provides a new and improved proximity sensor adapted for detecting the presence of a target such as gear teeth or shaft splines rotating within a sensing region. The new apparatus in accordance with the present invention is designed for application within hostile environments such as high pressure hydraulic equipment. Furthermore, the new apparatus is provided with a tailored sensitivity to permit fairly wide spacing from a rotating target, ensuring against physical damage from contact therewith while simultaneously providing sufficient sensitivity for reliable operation.

The proximity sensor of the present invention comprises housing means which includes a generally tubular elongate probe portion defining a closed cavity therein, a generally annular permanent magnet which is coaxially disposed within the cavity at the end thereof proximate the sensing region, means disposed concentrically with the magnet, constructed of at least one piece of ferrous material and coacting with the magnet to establish a focused magnetic field within the sensing region, MRS or magneticresistive sensor means also disposed within the magnet to detect distortion of the magnetic field effected by the target and, finally, means in circuit with the MRS sensor means which is operative to generate an output signal as a function of said sensed magnetic field distortion. This arrangement provides a sensor with a target passing therethrough from a safe stand-off position. Furthermore, this arrangement requires only point access to the target and is thus easily adaptable for application within crowded complex mechanisms.

In the preferred embodiment of the invention, the housing includes a body portion extending externally of a fixed machine housing for interface with a host machine circuit and the elongate probe portion extends inwardly of the machine housing to a terminus radially outwardly adjacent the path of travel of the the target. The probe portion threadably engages the machine housing for selective axial positioning of the sensor with respect to the rotating target. Furthermore, the body and probe portions of the housing are integrally formed of a non-ferrous material. This arrangement provides the advantage of the sensor which is easily adaptable to an existing machine and is readily adjustable with respect to the rotating target even in high pressure applications such as hydraulic pumps and motors.

According to another aspect of the invention, the housing body portion has a radial step formed therein which coacts with the external surface of the housing to embrace an application specific tubular spacer having a predetermined axial dimension for establishing inward limit of travel. This arrangement has the advantage of providing a single sensor design which can be employed in various machine applications and positions.

According to another aspect of the invention, a first seal is provided intermediate the housing means and spacer and a second seal is disposed intermediate the spacer and machine housing. This arrangement has the advantage of avoiding the necessity of sealing the probe to the machine housing at its threaded interface, thereby permitting blind assembly wherein a precise tactile feel is available to the installer who can threadably advance the proximity sensor until it contacts the target shaft to determine a maximum insertion limit. Thereafter, the installer would remove the sensor and install an appropriate spacer.

According to another aspect of the invention, the field focusing means comprises an elongated pin formed of ferrous material disposed coaxially within the magnet which is selectively axially positionable with respect thereto. Furthermore, the field focusing means also includes a tubular band formed of ferrous material disposed coaxially externally of the magnet. This arrangement has the advantage of establishing a focused field adjacent the end of the probe of the proximity sensor.

According to still aspect of the present invention, the MRS sensor means comprises first and second magnetoresistive elements having orthogonally disposed characteristic principle field sensing planes which are substantially parallel with the sensor axis of concentricity. The two elements are preferably positioned in a T or L configuration. This arrangement provides asymmetric magnetic interaction between the sensor and the rotating target.

These and other features and advantages of the present invention will become apparatus upon reading the following specification which, along with the patent drawings, describes and discloses a preferred and alternative embodiment of the invention in detail.

A detailed description of the embodiment of the invention makes reference to the accompanying drawings.

BRIEF DESCRIPTION OF THE DRAWINGS

FIG. 2 is a partial cross sectional view of the preferred embodiment of the proximity sensor of FIG. 1 on an expanded scale;

FIG. 3 is a partial section exploded view of the proximity sensor of FIG. 2;

FIG. 4 is a partial sectional end view of the proximity sensor of FIG. 2;

FIG. 6 is an end sectional view of an alternative embodiment of the proximity sensor of FIG. 2;

FIG. 7 is an end view of a center mounting post and MRS device of still another alternative embodiment for use in a proximity sensor such as shown in FIG. 2; and FIG. 8 is a side view of the alternative MRS device and center post of FIG. 7.

DETAILED DESCRIPTION OF THE PREFERRED AND ALTERNATIVE EMBODIMENTS OF THE INVENTION

Figure 1:
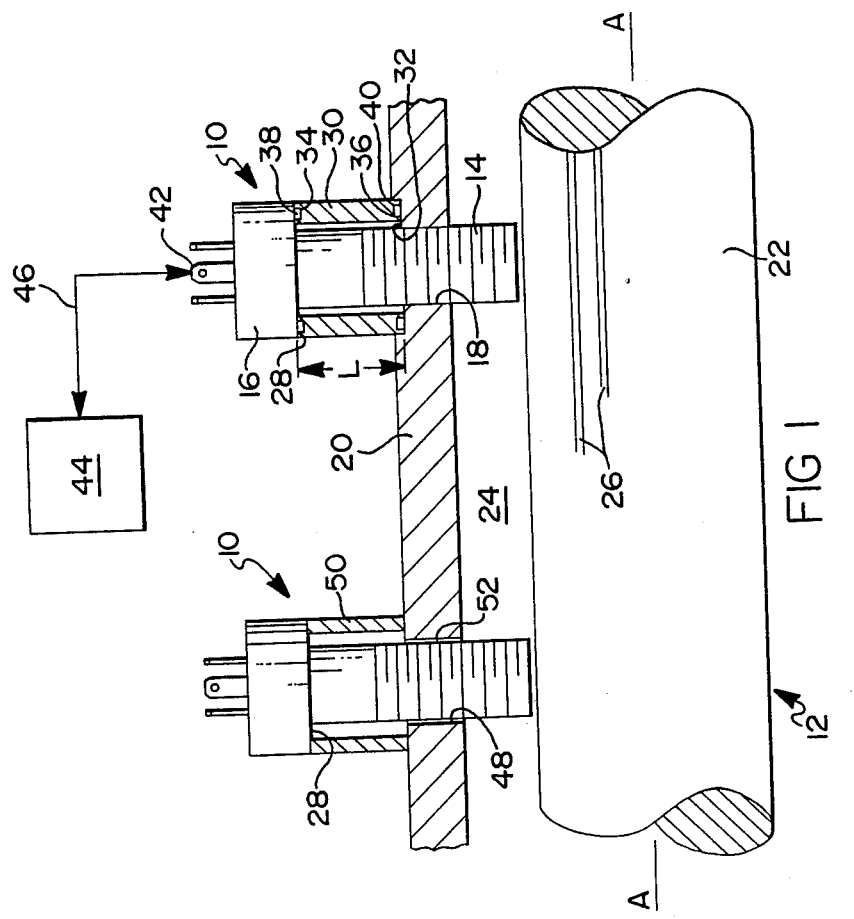
FIG. 1 is a partial cross section view of preferred and alternative proximity sensors installed within a host machine.

Referring to FIG. 1, a proximity sensor 10 is illustrated in assembly with a host hydraulic machine shown generally at 12. Sensor 10 has a housing 11 including an elongated tubular probe portion 14 depending from a body portion 16 of increased diameter. The outer surface of probe 14 has threads formed thereon which are engaged with mating threads within a through bore 18 formed within a housing 20 of machine 12. Machine 12 includes a rotating machine element such as a splined shaft 22 which is rotatably driven about axis A—A and is enclosed by housing 20. Pressurized hydraulic fluid is contained within the atmosphere 24 between housing 20 and shaft 22.

Figure 5:
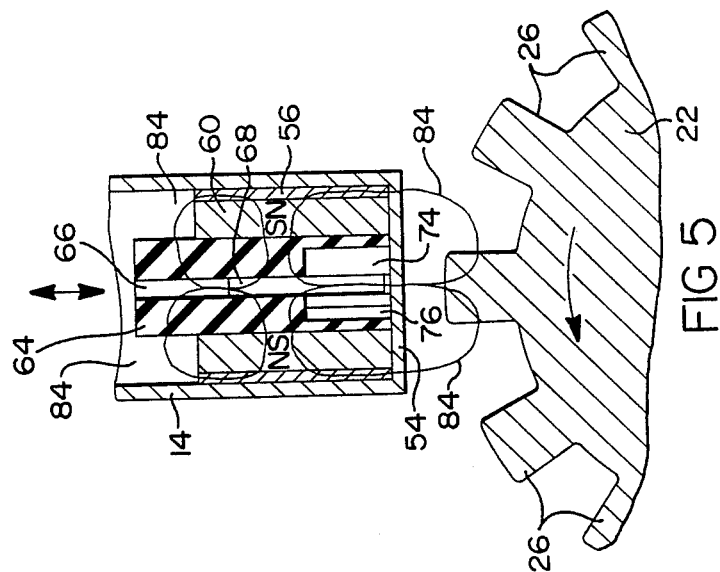
FIG. 5 is a broken sectional view of the proximity sensor of FIG. 2 on an expanded scale illustrating the magnetic interface thereof with a rotating target.

As best seen in FIG. 5, the outer surface of shaft 22 is defined by a number of axially extending circumferentially spaced splines 26. The radially outwardmost surface of splines 26 pass within the proximity of the end of probe 14 of sensor 10. Shaft 22 and splines 26 are constructed of steel or other suitable ferrous material, the specific configuration of which is intended as an example only. It is understood that the rectangular cross sectional shape of splines 26 could be altered and alternative machine element structure substituted such as gear teeth and the like. Furthermore, it is contemplated that a smooth surfaced shaft or machine element 22 could be employed if a suitable target were affixed for rotation therewith in proximity of sensor 10. Furthermore, although splines 26 are illustrated as being symmetrical, it is contemplated that the present invention could be employed with asymmetrical machine elements as will be described hereinbelow.

Sensor 10 has a step 28 formed therein at the point of transition between body portion 16 and probe 14. A generally tubular spacer 30 has its lower end nested within a recess 32 formed within the outer surface of housing 20 concentric with bore 18. The upper end of spacer 30 abuts step 28 to effectively limit inward displacement of sensor 10. Each end of spacer 30 has an axially outwardly opening radial channel 34 and 36 containing a suitable seal such as O-rings 38 and 40, respectively. O-ring 38 serves to seal the interface between body portion 16 and spacer 30 while O-ring 40 seals the interface between spacer 30 and housing 20.

Sensor 10 has a number of electrical terminals 42 which, in application, are electrically interconnected with a host machine control circuit 44 via conductors 46.

FIG. 1 also illustrates an alternative mounting configuration of proximity sensor 10 which is threadably engaged within a through bore 48 within housing 20 and has its inward limit of travel defined by a tubular spacer 50 inter-abutting step 28 of sensor 10 an the outer surface of housing 20. Sealing in the alternative mounting method is accomplished by the use of adhesive or chemical sealant 52 such as sold under the trade name Lock Tight. However, this arrangement has been found in some circumstances to be less desirable than the aforementioned mounting configuration for the reason that the chemical sealant 52 must be applied to the threads upon initial engagement of sensor 10 within bore 48. The chemical sealant 52 tends, upon assembly, to dampen the tactile feel of the assembler whereby if spacer 50 is of insufficient axial dimension, the probe portion of sensor 10 could actually contact splines 26 without the assembler's knowledge, leading to subsequent damage thereto.

Returning again to the preferred assembly (right-hand) as viewed in FIG. 1, installation is accomplished by providing the sealing function separately of the threaded engagement of sensor 10 with housing 20. Such assembly could be accomplished by threadably advancing sensor 10 within bore 18 without the presence of a spacer 30 until the innermost end of probe 14 contacts the outer surface of splines 26. The assembler could then back off or advance sensor 10 outwardly a presceibed distance, measure the axial dimension between recess 32 and step 28 and select an appropriately dimensioned (L) spacer. Upon final assembly, the installer retinas full tactile "feel" as sensor 10 threadably advances. Thus, if the assembler selected an incorrect dimensioned spacer 30 the bottoming of probe 14 against splines 26 would be readily apparent and the chances of corrective action being taken enhanced.

Referring to FIGS. 2 through 4, the internal structural details of sensor 10 are illustrated. Housing 11, including body portion 16 and probe portion 14, as well as an end closure member 54 are integrally formed from a suitable non-ferrous material such as stainless steel. An annular band 56 of steel or other suitable ferrous material is nestingly received within a cavity 58 within probe 14 at the end thereof nearest closure member 54. A radially polarized generally annular permanent magnet 60 having a generally square through bore 62 is concentrically disposed within band 56. An elongated rectangular center post 64 constructed of non-conductive material such as plastic is received within bore 62. Post 64 has an axial extending through passageway 66 within which is disposed an adjustment pin 68 constructed of suitable ferrous material such as magnet iron.

Band 56, magnet 60 and post 64 are advanced rightwardly, (as viewed in FIG. 3) until they are contact the inner surface of closure member 54. Pin 68 is slidably disposed within passage 66 as will be described hereinbelow.

Center post 64 has outwardly opening square recesses 70 and 72 formed in adjacent sides thereof for receiving magnetoresistive or MR transducers 74 and 76, respectively, of the type manufactured by Amprex Division of North American Phillips Model KMZ10C90. Transducers 74 and 76 are disposed to measure magnetic flux field along the axis of probe 14. MR transducers 74 and 76 are electrically interconnected with an output circuit, the constituent components of which are carried by a circuit board 78 which is also disposed within probe 14. Any number of known MR transducer drive circuits would be suitable for practicing the present invention Prior to final assembly, pin 68 is axially positioned at a predetermined location to tailor or produce a suitably shaped magnetic field external of closure member 54. The ideal shape of the magnetic field and thus position of sensor 68 will very from application to application. After final assembly, a suitable potting material 80 is used to fill the remainder of cavity 58 whereby cavity 58 is effectively sealed. Lastly, a connector plug 82 is nestingly disposed within body portion 16 to abut the inner surface of step 28. Plug 82 is held in its illustrated position by suitable fastening means, adhesive or by swedging or locally deforming body portion 16. The resulting assembly is found to be very robust and relatively insensitive to high pressure environments, vibration and the like.

In application, host machine circuit 44 serves to energize the circuit on circuit board 78, including transducers 74 and 76 as well as to receive a control signal therefrom. Referring to FIGS. 1 and 5, the applicants have found that the outer surface of closure member 54 can be spaced as much as 0.125 inches from the path of splines 26 as compared to a typically 0.005 to 0.010 inch spacing of typical prior art devices. The above described positioning of pin 68 enhances the sensitivity of sensor 10 at the point where splines 26 pass closest to closure member 54 by focusing the magnetic field as illustrated by flux lines 84 in FIG. 5. This focusing or inducement of axial asymmetries of the field can be effected by suitable positioning of pin 68 within passage 66.

The positioning of transducers 74 and 76 in an L configuration establishes asymmetrical sensing characteristic for asymmetrical targets by offsetting the null spot and enhancing sensitivity to specifically empirically established target shapes. This arrangement has been found to provide sensitivity such that the directional sense of passage of splines 26 before sensor 10 can be distinguished at circuit 44.

Referring to FIGS. 6, an alternative embodiment of the invention is illustrated wherein MR transducers 74 and 76 are arranged in a T configuration. Otherwise the alternative embodiment is as described hereinabove. The T shaped configuration has been shown to provide symmetrical sensing capability of sensor 10 about the central axis for vane shaped targets whereby the target (spline 26) can approach the target from any orientation without degradation of sensitivity. This has the advantage of permitting any rotational positioning of sensor 10 with respect to the axis of shaft 22.

Electrically, transducers 74 and 76 are disposed in a series additive bridge configuration such that as the target approaches, one transducer looses sensitivity while the other has a corresponding gain in sensitivity. The net result has been found that the sensitivity remains the same.

The applicants have found that housing 11 can retain its integrity exposed to pressures ranging from below 80 psi to in excess of 10,000 psi and operating temperatures ranging from −40° C. to 170° C.

Referring to FIGS. 7 and 8, an alternative design center post 86 is illustrated (positioned within a magnet 88 in phantom) in FIG. 7. The embodiment of FIGS. 7 and 8 differs from those described hereinabove in that only a single MR transducer 90 is employed positioned at an oblique angle to the axis of symmetry of probe portion 14.

It is to be understood that the invention has been described with reference to specific embodiments to provide the features and advantages previously described and that such embodiments are susceptible of modification such as will be apparent to those skilled in the art. For example, although housing 11 was described as being integrally formed from a single piece of material, it is contemplated that it could be formed from a number of constituent parts which are assembled such as to provide the necessary sealing and integrity for its intended application. Accordingly, the foregoing is not to be construed in a limiting sense.

What is claimed is:

1. A proximity sensor adapted for detecting the presence of a target within a sensing region, said sensor comprising:
   housing means including a generally tubular elongate probe portion defining a closed cavity therein;
   an annular permanent magnet coaxially disposed within said cavity at an end of said probe portion proximate said sensing region;
   means including at least one ferrous member disposed concentrically within said magnet and coacting therewith to establish a focused magnetic field within said region;

magnetoresistive sensor means disposed within said magnet to detect distortion of said magnetic field effected by said target; and means in circuit with said sensor means operative to generate an output signal as a function of said sensed magnetic field distortion, said field focusing means comprising an elongated pin formed of ferrous material disposed coaxially within said magnet and selectively axially positionable with respect to said magnet and sensor means.

2. The proximity sensor of claim 1 wherein said field focusing means further comprises a tubular band formed of ferrous material disposed coaxially externally of said magnet.

3. The proximity sensor of wherein said permanent magnet is radially polarized.

4. The proximity sensor of claim 1, wherein said sensor means comprises first and second magnetoresistive elements having orthogonally disposed characteristic principle field sensing planes.

5. The proximity sensor of claim 4, wherein said principle field sensing planes are substantially parallel with the sensor axis of concentricity.

6. The proximity sensor of claim 5, wherein said first and second elements are disposed in a T configuration.

7. The proximity sensor of claim 5, wherein said first and second elements are disposed in an L configuration.

8. The proximity sensor of claim 1, wherein said sensor means comprises a magnetoresistive element having a characteristic principle field sensing plane disposed obliquely to the sensor axis of concentricity.

9. The proximity sensor of claim 1, further comprising structure disposed concentrically within said magnet defining at least one recess for insulatively receiving said sensor means, and a bore for receiving said field focusing means.

10. The proximity sensor of claim 1, wherein said means in circuit with said sensor means is insulatively carried within said probe portion.

11. A proximity sensor adapted for detecting target portions of a rotating machine element disposed within a pressurized fluid environment confined by a relatively fixed machine housing, said sensor comprising:

housing means including a body portion extending externally of said machine housing for interface with a host machine circuit, and an elongate probe portion extending inwardly of said machine housing to a terminal radially outwardly adjacent the path of travel of said target portions, said probe portion defining a sealed cavity therein;

an annular permanent magnet coaxially disposed within said cavity adjacent said terminus;

means including at least one ferrous member disposed concentrically within said magnet and coacting therewith to establish a focused magnetic field within a sensing region external of said probe portion encompassing a limited segment of said target portion path of travel;

magnetoresistive sensor means disposed within said magnet to detect distortion of said magnetic field effected by said target portions; and means in circuit with said sensor means operative to generate an output signal as a function of said sensed magnetic field distortion, said means including at least one ferrous member comprising an elongated pin disposed coaxially within said magnet and selectively axially positionable with respect to said magnet and sensor means.

12. The proximity sensor of claim 11, wherein said probe portion threadably engages said machine housing for selective axial positioning of said sensor with respect to said rotating target portions.

13. The proximity sensor of claim 12, wherein said housing body portion has a radial step formed therein coacting with the external surface of said housing to embrace an application specific tubular spacer having a predetermined axial dimension for establishing a sensor inward limit of travel.

14. The proximity sensor of claim 13, further comprising first seal means disposed intermediate said housing means and spacer and second seal means disposed intermediate said spacer and machine housing.

15. The proximity sensor of claim 13, further comprising seal means disposed intermediate said housing means and said machine housing.

16. The proximity sensor of claim 11, wherein said body portion and probe portion are integrally formed.

17. The proximity sensor of claim 11, wherein said probe portion is formed of non-ferrous material.

18. A proximity sensor adapted for detecting the presence of a target within a sensing region, said sensor comprising:

housing means including a generally tubular elongate probe portion defining a closed cavity therein;

an annular permanent magnet coaxially disposed within said cavity at an end of said probe portion proximate said sensing region;

means including at least one ferrous member disposed concentrically within said magnet and coacting therewith to establish a focused magnetic field within said region;

magnetoresistive sensor means disposed within said magnet to detect distortion of said magnetic field effected by said target; and means in circuit with said sensor means operative to generate an output signal as a function of said sensed magnetic field distortion, said field focusing means comprising an elongated pin formed of ferrous material disposed coaxially within said magnet and a tubular band formed of ferrous material disposed coaxially externally of said magnet.

19. The proximity sensor of claim 18, wherein said permanent magnet is radially polarized.

20. The proximity sensor of claim 18, wherein said sensor means comprises first and second magnetoresistive elements having orthogonally disposed characteristic principle field sensing planes.

21. The proximity sensor of claim 20, wherein said principle field sensing planes are substantially parallel with the sensor axis of concentricity.

22. The proximity sensor of claim 21, wherein said first and second elements are disposed in a T configuration.

23. The proximity sensor of claim 21, wherein said first and second elements are disposed in an L configuration.

24. The proximity sensor of claim 18, wherein said sensor means comprises a magnetoresistive element having a characteristic principle field sensing plane disposed obliquely to the sensor axis of concentricity.

25. The proximity sensor of claim 18, further comprising structure disposed concentrically within said magnet defining at least one recess for insulatively receiving said sensor means, and a bore for receiving said field focusing means.

26. The proximity sensor of claim 18, wherein said means in circuit with said sensor means is insulatively carried within said probe portion.

27. A proximity sensor adapted for detecting target portions of a rotating machine element disposed within a pressurized fluid environment confined by a relatively fixed machine housing, said sensor comprising:

housing means including a body portion extending externally of said machine housing for interface with a host machine circuit, and an elongate probe portion extending inwardly of said machine housing to a terminus radially outwardly adjacent the path of travel of said target portions, said probe portion defining a sealed cavity therein;

an annular permanent magnet coaxially disposed within said cavity adjacent said terminus;

means including at least one ferrous member disposed concentrically within said magnet and coacting therewith to establish a focused magnetic field within a sensing region external of said probe portion encompassing a limited segment of said target portion path of travel;

magnetoresistive sensor means disposed within said magnet to detect distortion of said magnetic field effected by said target portions; and means in circuit with said sensor means operative to generate an output signal as a function of said sensed magnetic field distortion, said field focussing means comprising an elongated pin formed of ferrous material disposed coaxially within said magnet and a tubular band formed of ferrous material disposed coaxially externally of said magnet.

28. The proximity sensor of claim 27, wherein said probe portion threadably engages said machine housing for selective axial positioning of said sensor with respect to said rotating target portions.

29. The proximity sensor of claim 28, wherein said housing body portion has a radial step formed therein coacting with the external surface of said housing to embrace an application specific tubular spacer having a predetermined axial dimension for establishing a sensor inward limit of travel.

30. The proximity sensor of claim 29, further comprising first seal means disposed intermediate said housing means and spacer and second seal means disposed intermediate said spacer and machine housing.

31. The proximity sensor of claim 29, further comprising seal means disposed intermediate said housing means and said machine housing.

32. The proximity sensor of claim 27, wherein said body portion and probe portion are integrally formed.

33. The proximity sensor of claim 27, wherein said probe portion is formed of non-ferrous material.

* * * * *